United States Patent
Rosdahl, Jr. et al.

(10) Patent No.: US 10,603,837 B2
(45) Date of Patent: Mar. 31, 2020

(54) BELT LEVELING OF LAYERS IN A PART PRINTED BY ADDITIVE MANUFACTURING

(71) Applicant: Xerox Corporation, Norwalk, CT (US)

(72) Inventors: Robert E. Rosdahl, Jr., Ontario, NY (US); Richard P. Ficarra, Williamson, NY (US); Christine A. Steurrys, Williamson, NY (US)

(73) Assignee: Xerox Corporation, Norwalk, CT (US)

( * ) Notice: Subject to any disclaimer, the term of this patent is extended or adjusted under 35 U.S.C. 154(b) by 786 days.

(21) Appl. No.: 15/140,013

(22) Filed: Apr. 27, 2016

(65) Prior Publication Data
US 2017/0312982 A1 Nov. 2, 2017

(51) Int. Cl.
| | | |
|---|---|---|
| *B29C 64/20* | (2017.01) | |
| *B29C 64/35* | (2017.01) | |
| *B33Y 30/00* | (2015.01) | |
| *B29C 64/124* | (2017.01) | |
| *B33Y 10/00* | (2015.01) | |

(52) U.S. Cl.
CPC ............ *B29C 64/124* (2017.08); *B29C 64/20* (2017.08); *B29C 64/35* (2017.08); *B33Y 10/00* (2014.12); *B33Y 30/00* (2014.12)

(58) Field of Classification Search
CPC .............................. B29C 64/124; B29C 64/20
USPC ......................................................... 264/308
See application file for complete search history.

(56) References Cited

U.S. PATENT DOCUMENTS

| | | | | |
|---|---|---|---|---|
| 4,684,684 A | * | 8/1987 | Abe ......................... | C08K 5/20 524/227 |
| 5,878,664 A | * | 3/1999 | Hartka ..................... | B41C 1/003 101/216 |
| 5,967,958 A | * | 10/1999 | Borkenhagen ........ | B29C 33/044 162/206 |
| 6,305,769 B1 | * | 10/2001 | Thayer ................... | B33Y 40/00 347/1 |
| 6,453,134 B1 | * | 9/2002 | Ziegelmuller ....... | G03G 15/168 399/101 |
| 6,612,824 B2 | * | 9/2003 | Tochimoto .............. | B29C 41/36 425/130 |
| 6,975,819 B2 | * | 12/2005 | Katamoto .......... | G03G 15/5025 399/81 |
| 9,002,496 B2 | * | 4/2015 | Elsey ...................... | B29C 64/20 700/120 |
| 10,144,175 B2 | * | 12/2018 | Batchelder ............ | B29C 64/188 |
| 2015/0024169 A1 | * | 1/2015 | Martin ................... | B33Y 70/00 428/172 |

(Continued)

*Primary Examiner* — Michael H. Wilson
*Assistant Examiner* — Russell E Sparks
(74) *Attorney, Agent, or Firm* — Maginot Moore & Beck LLP

(57) ABSTRACT

A three-dimensional object printing system improves the leveling of an object during object printing and removal of waste material during leveling. The printing system includes a material applicator configured to expel material, a member configured to move in a process direction to a position opposite the material applicator to enable the material applicator to expel material onto the member, and a belt assembly. The belt assembly includes a first roller, a second roller, and a continuous belt entrained about the first roller and the second roller. The belt assembly is configured to remove a portion of the material ejected onto the member. The belt assembly is further configured to move the removed portion of the material away from the member.

12 Claims, 7 Drawing Sheets

(56) References Cited

U.S. PATENT DOCUMENTS

2015/0266241 A1* 9/2015 Batchelder ............ B29C 64/188
264/484

* cited by examiner

BELT LEVELING OF LAYERS IN A PART PRINTED BY ADDITIVE MANUFACTURING

TECHNICAL FIELD

The system and method disclosed in this document relate to printers that produce three-dimensional objects and, more particularly, to leveling mechanisms in such printers.

BACKGROUND

Digital three-dimensional manufacturing, also known as digital additive manufacturing, is a process of making a three-dimensional solid object of virtually any shape from a digital data model. Polyjet three-dimensional printing, for example, is an additive process in which one or more material applicators expel successive layers of material on a substrate in different shapes. The substrate is supported either on a platform that can be moved three dimensionally by operation of actuators operatively connected to the platform, or the one or more material applicators are operatively connected to one or more actuators for controlled movement of the one or more material applicators to produce the layers that form the object. Three-dimensional printing is distinguishable from traditional object-forming techniques, which mostly rely on the removal of material from a work piece by a subtractive process, such as cutting or drilling.

One process for producing three-dimensional objects with a three-dimensional printing system 10 is illustrated in FIGS. 4A-4D. As shown in FIG. 4A, at the beginning of a printing operation, a member 14 and at least one material applicator 18 are positioned such that the at least one material applicator 18 is spaced vertically above the member 14 by the height H, and the member 14 is to the left of the at least one material applicator 18.

As shown in FIG. 4B, as the member 14 and the at least one material applicator 18 then move relative to one another, the member 14 moves toward the right relative to the at least one material applicator 18. As the member 14 passes underneath the at least one material applicator 18, material 22 is expelled from at least one expulsion element 26, such as a nozzle, ejector, or extruder, of the at least one material applicator 18 toward various locations of the member 14 to form a first layer 30 of an object 34.

Next, as shown in FIG. 4C, when the first layer 30 of the object 34 has been completed, the at least one material applicator 18 and the member 14 are moved relative to one another such that the at least one material applicator 18 is spaced above the first layer 30 by the height H. In other words, the at least one material applicator 18 and the member 14 are moved vertically apart from one another to accommodate a thickness T of the object 34 atop the member 14. Additionally, the member 14 is again positioned to the left of the at least one material applicator 18.

As shown in FIG. 4D, as the member 14 and the at least one material applicator 18 then move relative to one another, the member 14 again moves toward the right relative to the at least one material applicator 18 in the same manner as described above. As the member 14 passes underneath the at least one material applicator 18, the material 22 is expelled from the at last one expulsion element 26 of the at least one material applicator 18 toward various locations of the member 14 to form a second layer 38 of the object 34 atop the first layer 30. Accordingly, the thickness T of the object 34 is increased by the material 22 of the second layer 38. This process can be repeated as many times as necessary to form the object 34.

This three-dimensional object printing process is an additive process, and material 22 is repeatedly added to the object 34 such that the thickness T of the object 34 increases throughout the process. Accordingly, to accommodate the increasing thickness T of the object 34, the height H of the material applicator 18 relative to the member 14 is also increased after each layer is added to the object 34 and before another layer is added. In other words, the material applicator 18 and the member 14 are moved vertically apart from one another after each layer is added to the object 34.

One issue that arises in the production of three-dimensional objects with a three-dimensional object printer in the manner described above is the possibility that independent expulsion elements 36 within a single material applicator 18 or independent material applicators 18 eject varying amounts of material 22. In other words, the three-dimensional object printer may expel variable volumes of material 22 from different expulsion elements 36 or from different material applicators 18. As the object 34 is formed, variable volumes of material 22 produce height variation within each layer, which result in a cumulative height variation within the object 34. Thus, some previously known three-dimensional object printers level the top surface of an object 34 to correct for height variations in each layer of the object to produce a more precisely shaped object.

In these previously known three-dimensional object printers that level the layers in objects being formed by the printer to correct for height variations, the removal of material that has been separated from the object during leveling can be problematic. To prevent contamination of the object, the separated material must be moved away from the object and the elements that come in contact with the object. Accordingly, a three-dimensional object printer capable of removing material which has been separated from the object during leveling would be advantageous because such a three-dimensional object printer would be able to produce an object with less contamination.

SUMMARY

A three-dimensional object printing system includes a material applicator, a platform, and a belt assembly. The material applicator expels material, and the platform moves in a process direction to be positioned opposite the material applicator to enable the material applicator to form a layer of an object on the platform with the expelled material. The belt assembly is positioned to be opposite the object on the platform, and the belt assembly includes a first roller, a second roller, a continuous belt, an actuator, and a blade. The first roller rotates in a direction opposite the process direction, and the second roller is located at a position that enables the first roller to be between the platform and the second roller. The second roller has a heater configured to heat the second roller to a temperature high enough to reduce a viscosity of the material forming the object on the platform. The continuous belt is entrained about the first roller and the second roller, and the actuator is operatively connected to the first roller or the second roller to drive the operatively connected roller and move the continuous belt about the first and the second roller to remove a portion of the material forming the object and to transport the removed portion of the material to the second roller. The blade is positioned to contact the continuous belt and scrape the removed portion of the material from the continuous belt.

A method of printing an object in a three-dimensional printing system includes forming with a material applicator a layer of an object on a platform positioned opposite the material applicator. The method further includes rotating with an actuator at least one of two rollers about which a continuous belt is entrained to drive the belt around the first roller and the second roller. The first roller is between the second roller and the platform. The method also includes moving the platform in a process direction to enable the layer of the object to engage the continuous belt at a position opposite the first roller, and removing a portion of the layer of the object on the platform with the continuous belt interposed between the first roller and the platform. The method further includes moving the removed portion of the layer with the continuous belt to a position opposite a portion of the second roller, heating the second roller with a heater to enable the removed portion of the layer to be heated to a temperature high enough to reduce a viscosity of the material forming the layer, and moving the heated portion of the removed material with the belt to a blade. The method also includes scraping the heated removed portion of the layer from the belt with the blade.

An assembly for removing a portion of material from an object in a three-dimensional printing system includes a first roller, a second roller, a continuous belt, an actuator, and a blade. The continuous belt is entrained about the first roller and the second roller. The second roller has a heater configured to heat the second roller to a temperature high enough to reduce a viscosity of a predetermined material. The actuator is operatively connected to the first roller or the second roller to drive the operatively connected roller and move the continuous belt about the first and the second roller to enable the rotating continuous belt to remove a portion of a layer of the predetermined material forming an object and to transport the removed portion of the layer to the second roller. The blade is positioned to contact the belt and scrape the removed portion of the layer from the belt.

BRIEF DESCRIPTION OF THE DRAWINGS

The foregoing aspects and other features of a three-dimensional object printer and method for leveling an object being formed by the printer to correct for height variations in each layer of the object are explained in the following description, taken in connection with the accompanying drawings.

DETAILED DESCRIPTION

Figure 1:
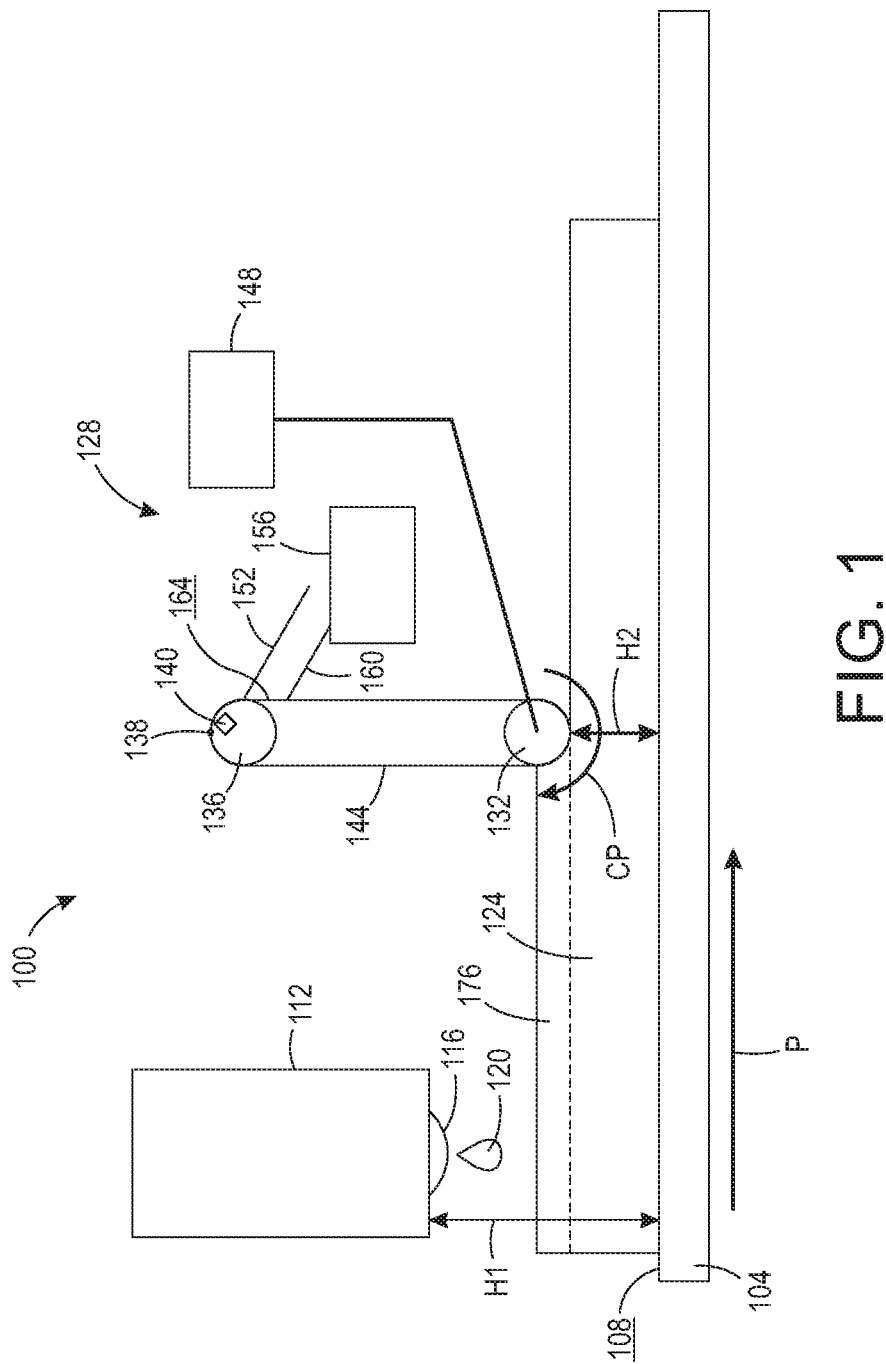
FIG. 1 shows a printing system including an object and a belt assembly.

For a general understanding of the environment for the system and method disclosed herein as well as the details for the system and method, reference is made to the drawings. In the drawings, like reference numerals have been used throughout to designate like elements.

A three-dimensional object printing system, or printer, 100 is shown in FIG. 1. The printing system 100 is similar to the printing system 10 of the prior art, described above and shown in FIGS. 4A-4D. Like the prior art printing system 10, the printing system 100 includes a substrate or a member 104 having a planar surface 108, and at least one material applicator 112 including at least one material expulsion element 116. The at least one expulsion element 116 on the at least one material applicator 112 faces toward the member 104. The printing system 100 is configured to expel material 120 from the at least one material applicator 112, through the at least one expulsion element 116, onto the planar surface 108 of the member 104 to form an object 124. Accordingly, to receive the material 120, the member 104 is positioned at a location beneath the at least one material applicator 112 that enables the object 124 and the member 104 to pass beneath the at least one material applicator 112 without contacting the at least one material applicator.

The printing system 100 differs from the prior art printing system 10, however, in that the printing system 100 also includes a belt assembly 128 having a first roller 132, a second roller 136, a heater 140, a continuous belt 144, an actuator 148, a blade 152 and a waste container 156. In the embodiment described herein, the belt assembly 128 further includes a second blade 160. As described in more detail below, the actuator 148 is operatively connected to the first roller 132 to drive the first roller 132 to rotate the continuous belt 144 about the first roller 132 and the second roller 136.

The first roller 132 of the belt assembly 128 is positioned relative to the at least one material applicator 112 and the member 104. The material applicator 112 is positioned at a height H1 above the member 104 and, as described above with respect to the Background, the height H1 of the material applicator 112 relative to the member 104 can be changed by moving the material applicator 112 and the member 104 vertically closer to one another or farther from one another. The first roller 132 is positioned at a height H2 above the member 104 that is less than the height H1 at which the material applicator 112 is positioned above the member 104. In other words, the first roller 132 is positioned vertically nearer to the member 104 than the material applicator 112 is to the member 104. Because the height H2 is less than the height H1, the belt assembly 128 is able to contact an object 124 formed on the member 104 without the material applicator 112 contacting the object 124.

As further described above with respect to the Background, the material applicator 112 and the member 104 can also move relative to one another along a process direction P, which is perpendicular to the height H1. As the material applicator 112 and the member 104 move relative to one another along the process direction P, material 120 ejected from the material applicator 112 lands in different locations on the member 104 to form the object 124. The first roller 132 is positioned downstream from the material applicator 112 in the process direction P. In other words, when the member 104 moves in the process direction P relative to the material applicator 112, the member 104 is positioned beneath the material applicator 112 before the member 104 is positioned beneath the first roller 132.

The first roller 132 is driven by the actuator 148 to rotate in a counter-process direction CP, which is directly opposite to the process direction P. In FIG. 1, the actuator 148 is shown positioned above and to the right of the first roller 132. However, the actuator 148 can be positioned anywhere relative to the first roller 132 that enables the actuator 148 to be operatively connected to the first roller 132 to drive the first roller 132 to rotate in the counter-process direction CP.

The second roller 136 is positioned above the first roller 132. In other words, the second roller 136 is positioned vertically farther from the member 104 than the first roller 132 is from the member 104. In the embodiment shown, the second roller 136 is positioned directly above the first roller 132. However, in alternative embodiments, the second roller 136 does not need to be positioned directly above the first roller 132. For example, the second roller 136 can be positioned above and to the right of the first roller 132. The second roller 136 includes an uppermost point 138, which is the point of the second roller 136 arranged vertically farthest from the member 104.

The heater 140 is arranged within the second roller 136 to direct heat toward the second roller 136. The heater 140 is configured to produce heat having a temperature that is high enough to reduce the viscosity of the material 120, allowing it to flow easily down the blade 152. Accordingly, the second roller 136 is made of a material which has a higher melting temperature than the melting temperature of the material 120 so that the material which forms the second roller 136 is not affected or damaged by the heat produced by the heater 140. Furthermore, the second roller 136 is made of a material which is able to conduct the heat produced by the heater 140 through the second roller 136. In other words, the heater 140 heats the second roller 136 to a temperature that is high enough to reduce the viscosity of the material 120.

In the embodiment shown, the heater 140 is arranged within the second roller 136. In alternative embodiments, however, the heater 140 can be arranged outside the second roller 136 so as to direct heat toward the second roller 136. In such embodiments, the second roller 136 need not be made of a material which is able to conduct the heat produced by the heater 140 through the second roller 136.

The continuous belt 144 is entrained about the first roller 132 and the second roller 136 such that rotation of the first roller 132 moves the continuous belt 144 to rotate the second roller 136. In other words, the continuous belt 144 translates rotational movement of the first roller 132 into rotational movement of the second roller 136. Like the second roller 136, the continuous belt 144 is also made of a material which has a higher melting temperature than the melting temperature of the material 120 so that the material which forms the continuous belt 144 is not affected or damaged by the second roller 136, which is heated by the heater 140. Furthermore, the continuous belt 144 is also made of a material that is able to conduct the heat of the second roller 136 through the continuous belt 144. Thus, where the continuous belt 144 comes in contact with the second roller 136, the continuous belt 144 is heated to a temperature that is high enough to reduce the viscosity of the material 120.

The blade 152 is positioned to contact the continuous belt 144 after the continuous belt 144 is heated by the second roller 136. The blade 152 is further positioned to contact the continuous belt 144 at an angle so as to scrape an outer surface 164 of the continuous belt 144. Accordingly, the blade 152 is configured to clean off the outer surface 164 of the continuous belt 144 as the continuous belt 144 rotates past the blade 152 in the counter-process direction CP. The blade 152 is also angled such that anything which is scraped off the outer surface 164 of the continuous belt 144 moves along the blade 152, due to gravity, and into the waste container 156. Accordingly, the waste container 156 is positioned downwardly of the blade 152. The blade 152 is made of a material which facilitates the flow of material into the waste container 156. In some embodiments, the blade 152 is made of a non-stick material for this purpose.

In at least one embodiment, the blade 152 is arranged to contact the continuous belt 144 at a position opposite the second roller 136. In other words, the continuous belt 144 is interposed between and simultaneously contacted by both the blade 152 and the second roller 136. In such embodiments, the second roller 136, which is fixed in position relative to the blade 152, provides stable resistance against which the blade 152 can be pressed. Accordingly, the blade 152 can apply greater pressure to the continuous belt 144 as the continuous belt rotates past the blade 152, because the blade 152 can force the continuous belt 144 against the second roller 136. In such embodiments, the blade 152 is configured to scrape the outer surface 164 of the continuous belt 144 more effectively.

In embodiments of the belt assembly 128 that include the second blade 160, the second blade 160 is positioned to contact the continuous belt 144 after the blade 152 contacts the continuous belt 144. Like the blade 152, the second blade 160 is also positioned to contact the continuous belt 144 at an angle to scrape the outer surface 164 of the continuous belt 144. Accordingly, the second blade 160 is configured to clean off the outer surface 164 of the continuous belt 144 as the continuous belt 144 rotates past the second blade 160 in the counter-process direction CP such that anything which is scraped off the outer surface 164 of the continuous belt 144 moves along the second blade 160, due to gravity, into the waste container 156. Accordingly, the waste container 156 is also positioned downwardly of the second blade 160. Like the blade 152, the second blade 160 also is made of a material which facilitates the flow of material into the waste container 156. In some embodiments, the second blade 160 is made of a non-stick material for this purpose.

Figure 2A:
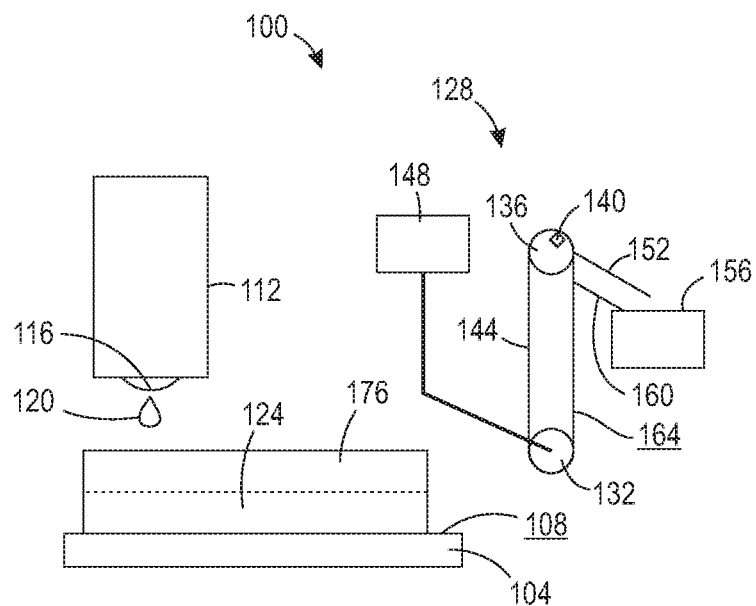
FIG. 2A shows a side view of the printing system of FIG. 1, prior to performing a first portion of a process to level the object.

In use, the belt assembly 128 removes a portion of the object 124 to level the object 124 and moves the removed portion of the object 124 away from the object 124 to reduce contamination of the object 124. As shown in FIG. 2A, before the belt assembly 128 contacts the object 124, the material applicator 112 applies material 120 to the member 104 to form layers of the object 124. The layer of material 120 most recently applied to the member 104 forms a top layer 176 of the object 124.

Figure 2B:
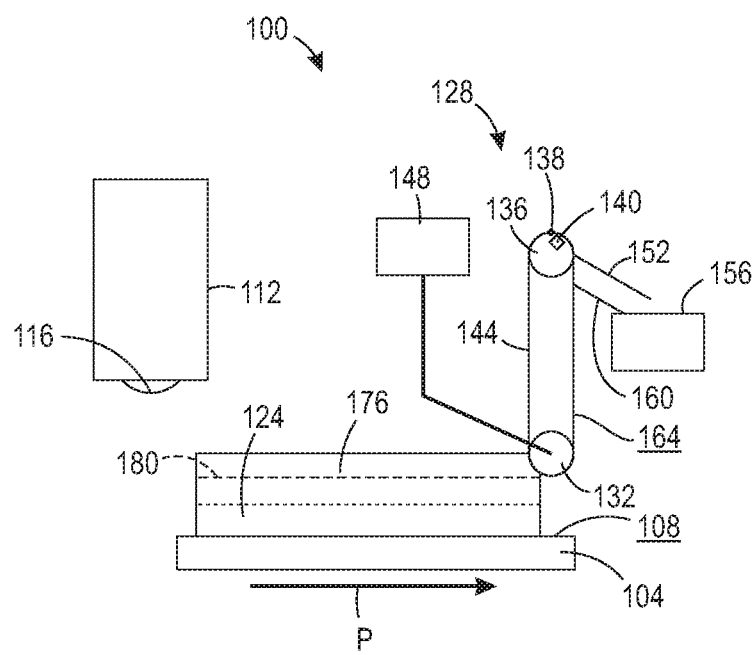
FIG. 2B shows a side view of the printing system of FIG. 2A after a first portion of the process to level the object has been completed.

As shown in FIG. 2B, after the top layer 176 of the object 124 is formed, the member 104 moves in the process-direction P to bring the object 124 into contact with the belt assembly 128. More specifically, the top layer 176 of the object 124 is brought into contact with the continuous belt 144 where the continuous belt 144 is supported by the first roller 132. Accordingly, the continuous belt 144 is pressed against the top layer 176 of the object 124 by the first roller 132. The depth at which the continuous belt 144 is pressed against the top layer 176 by the first roller 132 determines a depth 180 at which the material 120 (shown in FIG. 2A) forming the top layer 176 encounters the belt assembly 128.

Figure 2C:
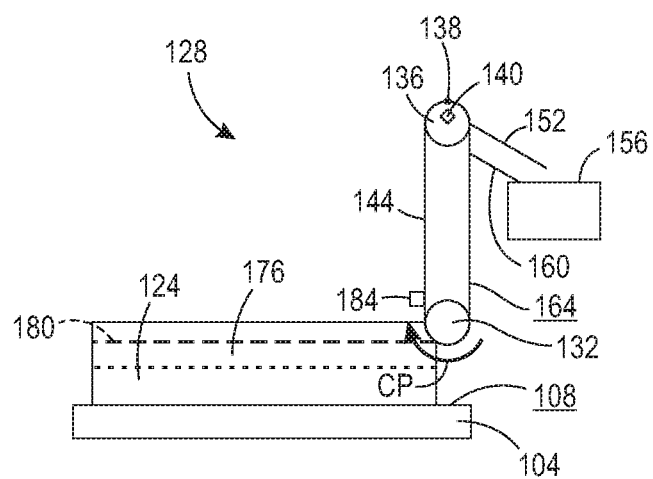
FIG. 2C shows a side view of the printing system of FIG. 2A after a second portion of the process to level the object has been completed.
Figure 2D:
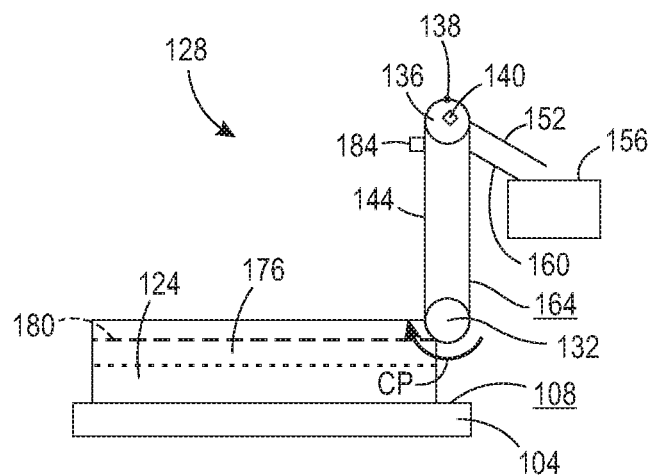
FIG. 2D shows a side view of the printing system of FIG. 2A after a third portion of the process to level the object has been completed.

As shown in FIG. 2C, by rotating in the counter-process direction CP, the first roller 132 moves the continuous belt 144 against the top layer 176 of the object 124 at the depth 180 to remove a portion of the top layer 176 of the object 124. The removed portion 184 of the object 124 is carried away from the object 124 by the continuous belt 144 in the counter-process direction CP. As shown in FIG. 2D, the continuous belt 144 carries the removed portion 184 of the object 124 in the counter-process direction CP toward the second roller 136.

Figure 2E:
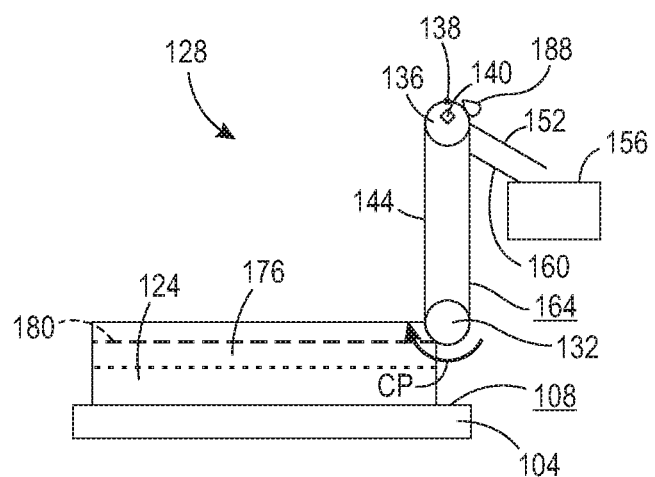
FIG. 2E shows a side view of the printing system of FIG. 2A after a fourth portion of the process to level the object has been completed.

As shown in FIG. 2E, the continuous belt 144 carries the removed portion 184 (shown in FIGS. 2C and 2D) to a position arranged opposite the heater 140 where the heat directed by the heater 140 toward the second roller 136 reduces the viscosity of the material 120 (shown in FIG. 2A). More specifically, because the second roller 136 and the continuous belt 144 are heated to the temperature high enough to reduce the viscosity of the material 120, and because the second roller 136 and the continuous belt conduct the heat, the viscosity of the material 120 is reduced to form a reduced viscosity portion 188 as it passes the second roller 136.

As shown in FIG. 2E, the removed portion 184 (shown in FIGS. 2C and 2D) is not heated to form the reduced viscosity portion 188 until the continuous belt 144 has moved the removed portion 184 of the material 120 past the uppermost point 138 of the second roller 136. In the embodiment shown, the heater 140 is arranged to heat the second roller 136 after the uppermost point 138 so that the reduced viscosity portion 188 flows toward the blade 152 rather than toward the member 104. In alternative embodiments, the heater 140 is arranged to heat the second roller 136 at a different position. However, heating the removed portion 184 so it does not flow back toward the first roller 132 and the member 104 is advantageous since this configuration prevents the reduced viscosity portion 188 from contaminating the object 124.

Figure 2F:
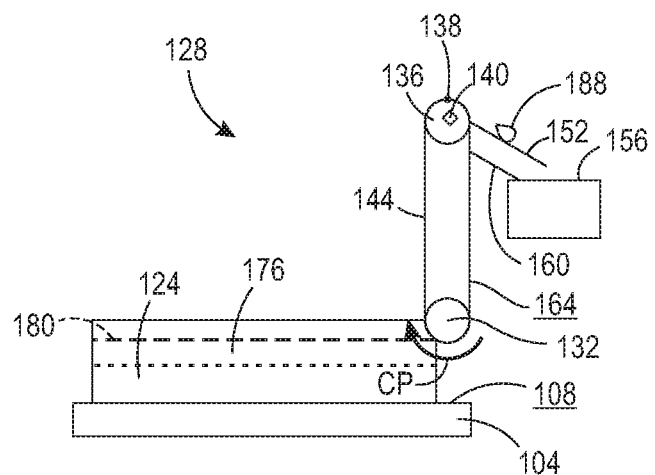
FIG. 2F shows a side view of the printing system of FIG. 2A after a fifth portion of the process to level the object has been completed.

As shown in FIG. 2F, when the portion of the continuous belt 144 supporting the reduced viscosity portion 188 reaches the blade 152, the contact between the blade 152 and the continuous belt 144 separates the reduced viscosity portion 188 from the continuous belt 144. In other words, the blade 152 scrapes the reduced viscosity portion 188 off the continuous belt 144. The blade 152 further retains the reduced viscosity portion 188 above the blade 152 to enable gravity to facilitate movement of the reduced viscosity portion 188 that has been scraped off the continuous belt 144 along the blade 152 toward the waste container 156.

Figure 2G:
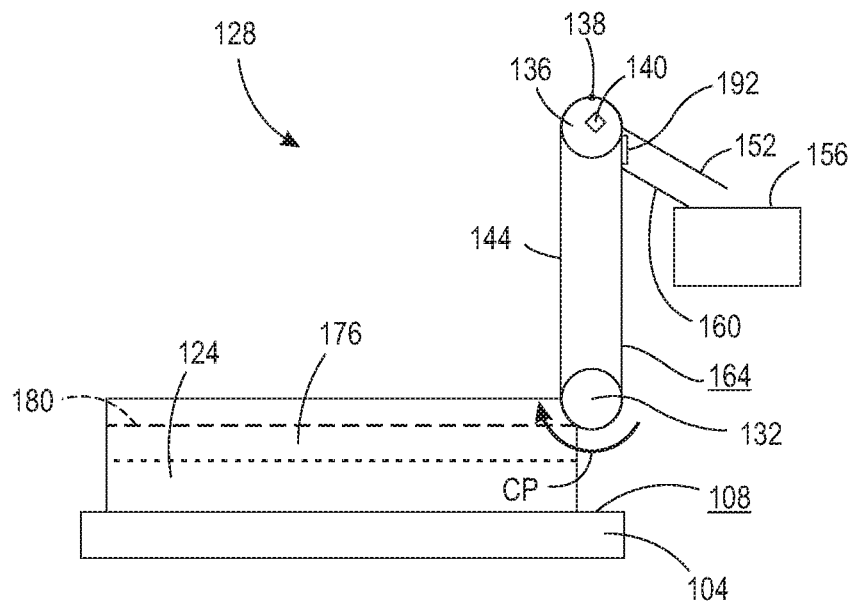
FIG. 2G shows a side view of the printing system of FIG. 2A after a sixth portion of the process to level the object has been completed.

The blade 152 may not scrape the reduced viscosity portion 188 off the continuous belt 144 completely. In this case, as shown in FIG. 2G, some remaining portion 192 of material 120 is left on the continuous belt 144. In other words, after the continuous belt 144 has moved the reduced viscosity portion 188 (shown in FIGS. 2E and 2F) past the blade 152, the continuous belt 144 continues to move in the counter-process direction CP to bring the remaining portion 192 into contact with the second blade 160. In the same manner as the blade 152, contact between the second blade 160 and the continuous belt 144 separates the remaining portion 192 from the continuous belt 144. In other words, the second blade 160 scrapes the remaining portion 192 off the continuous belt 144. The second blade 160 further retains the remaining portion 192 above the second blade 160 to enable gravity to facilitate movement of the remaining portion 192 that has been scraped off the continuous belt along the second blade 160 toward the waste container 156. The process shown in FIGS. 2A-2G can be performed continuously as the member 104 passes beneath the belt assembly 128 and brings the object 124 into contact with the belt assembly 128. Furthermore, the process shown in FIGS. 2A-2G can be performed repeatedly after each new top layer 176 (shown in FIG. 2A) is added to the object 124.

One advantage of the printing system 100 is that the removed portion 184 of the object 124 is carried away from the object 124 by a distance that is substantial relative to the size of the object 124, which reduces the likelihood of contamination of the object 124 in the event that the removed portion 184 is prevented from flowing directly into the waste container 156. Another advantage of the printing system 100 is that the continuous belt 144 is able to move an amount of material 120 that is substantial relative to the size of the object 124 away from the object 124, which reduces the likelihood of a build-up of removed material at the surface of the object 124.

Figure 3:
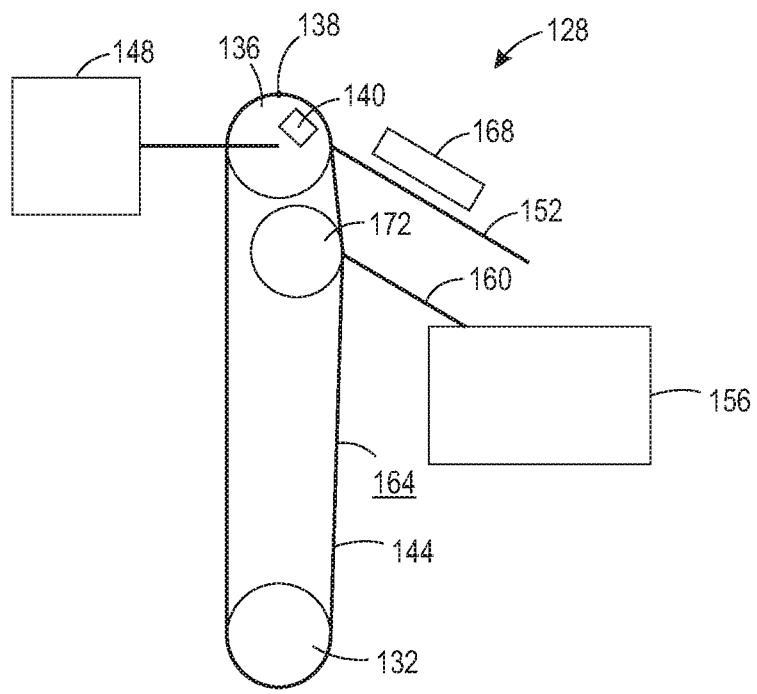
FIG. 3 shows an alternative embodiment of the belt assembly of the printing system of FIG. 1.
Figure 4A:
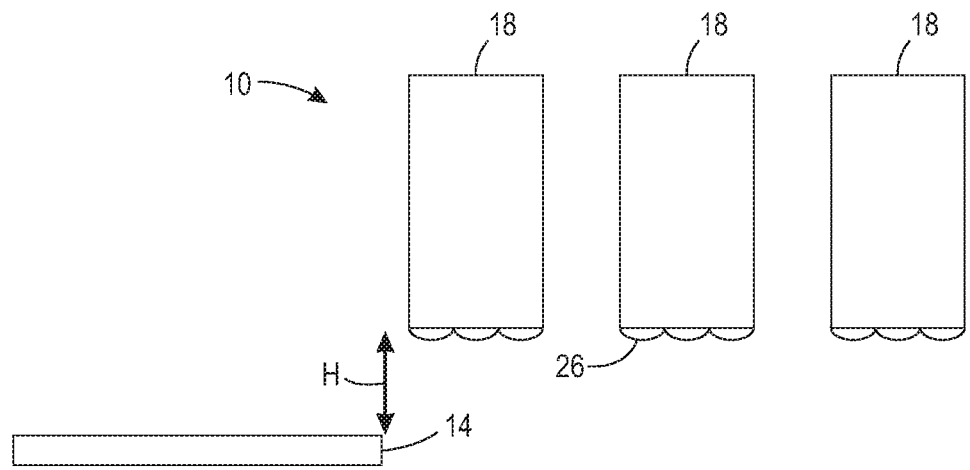
FIG. 4A shows a side view of a prior art three-dimensional object printer prior to performing a first portion of a process to form an object.
Figure 4B:
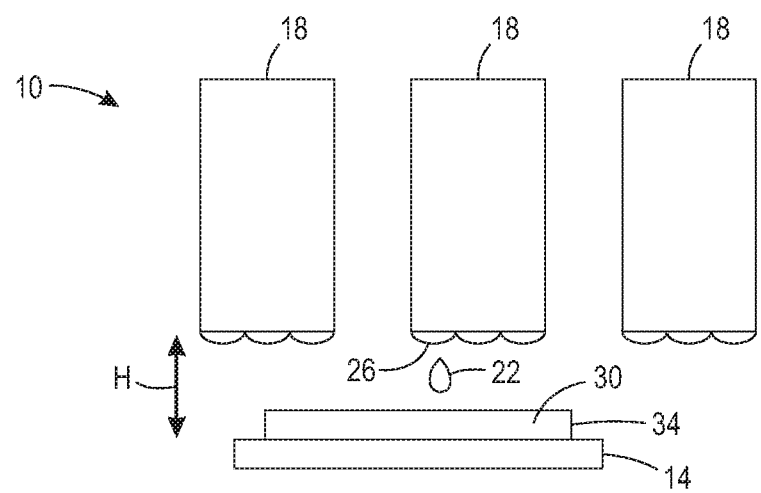
FIG. 4B shows a side view of the prior art three-dimensional object printer of FIG. 4A after a first portion of the process to form the object has been completed.
Figure 4C:
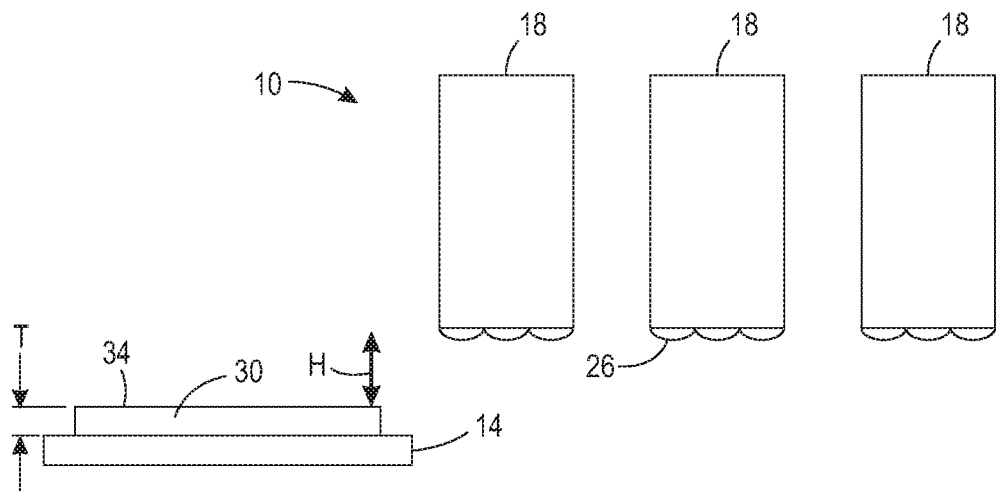
FIG. 4C shows a side view of the prior art three-dimensional object printer of FIG. 4A after a second portion of the process to form the object has been completed.
Figure 4D:
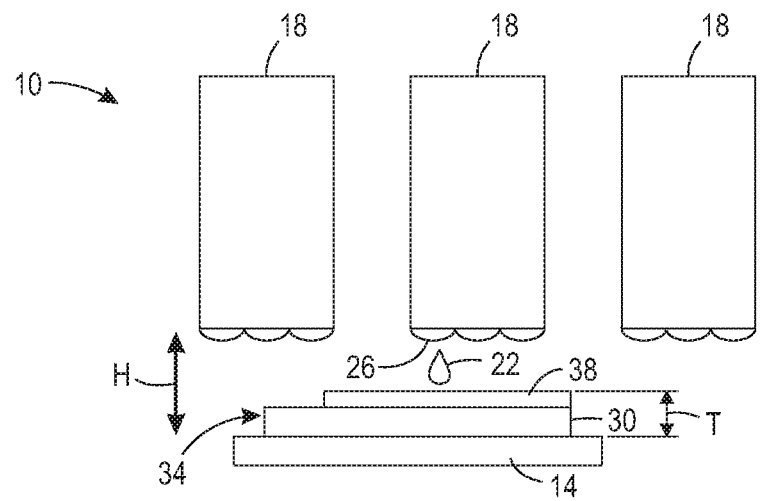
FIG. 4D shows a side view of the prior art three-dimensional object printer of FIG. 4A after a third portion of the process to form the object has been completed.

FIG. 3 depicts alternative embodiments of some of the elements of the belt assembly 128. One or more of these alternatively embodied elements may be included in various alternative embodiments of the belt assembly 128. Firstly, in at least one embodiment, the belt assembly 128 can include the actuator 148 operatively connected to the second roller 136 rather than to the first roller 132. In such embodiments, the actuator 148 drives the second roller 136 to rotate the continuous belt 144 about the first roller 132 and the second roller 136.

Also shown in FIG. 3, in at least one embodiment, the belt assembly 128 can further include a second heater 168 configured to heat the blade 152 to a temperature high enough to reduce the viscosity of the material 120 and is positioned directly opposite the blade 152 to direct heat toward the blade 152. In such embodiments, the blade 152 is made of a material having a higher melting temperature than the melting temperature of the material 120 so that the second heater 168 does not affect or damage the material of the blade 152. In a further alternative embodiment, the second heater 168 can be positioned underneath the blade 152 so as to direct heat toward the blade 152. In such embodiments, the blade 152 is further made of a material which is able to conduct heat through the blade 152.

In at least one alternative embodiment of the belt assembly 128 that includes the second blade 160, the belt assembly 128 can also include a third heater substantially similar to the second heater 168, described above. The third heater is configured to heat the second blade 160 to a temperature high enough to reduce the viscosity of the material 120 and can be positioned directly opposite the second blade 160, to direct heat toward the second blade 160, or underneath the second blade 160, to direct heat toward the second blade 160. In embodiments where the third heater is positioned directly opposite the second blade 160, the second blade 160 is made of a material having a higher melting temperature than the melting temperature of the material 120 so that the third heater does not affect or damage the material of the second blade 160. In embodiments where the third heater is positioned underneath the second blade 160, the second blade 160 is further made of a material which is able to conduct heat through the second blade 160.

Also shown in FIG. 3, in at least one embodiment, the belt assembly 128 can further include a third roller 172 about which the continuous belt 144 is entrained. In such embodiments, the third roller 172 is arranged vertically nearer to the first roller 132 than the second roller 136 is to the first roller 132. The third roller 172 is further arranged at a fixed position relative to the second blade 160 such that the second blade 160 contacts the continuous belt 144 at a position opposite the third roller 172. In other words, the continuous belt 144 is interposed between and simultaneously contacted by both the second blade 160 and the third roller 172. In such embodiments, the third roller 172 provides stable resistance against which the second blade 160 can be pressed. Accordingly, the second blade 160 can apply greater pressure to the continuous belt 144 as the continuous belt rotates past the second blade 160, because the second blade 160 can force the continuous belt 144 against the third roller 172. In such embodiments, the second blade 160 is configured to scrape the outer surface 164 of the continuous belt 144 more effectively.

In the embodiment shown in FIG. 3, the third roller 172 is smaller than the first roller 132 and the second roller 136. Because the third roller 172 is used only to provide stable resistance to the second blade 160, the third roller 172 can be smaller to reduce material used to form the belt assembly 128. In alternative embodiments, however, the relative sizes of the first roller 132, the second roller 136, and the third roller 172 can be different than those shown. Additionally, in the embodiment shown in FIG. 3, the third roller 172 is not directly aligned with the first roller 132 and the second roller 136. Because the third roller 172 is used only to provide stable resistance to the second blade 160, the third roller 172 can be offset relative to the first roller 132 and the second roller 136 to convexly bend the continuous belt 144 to further facilitate scraping the outer surface 164 of the continuous belt 144 with the second blade 160. In alternative embodiments, however, the alignment of the third roller 172 relative to the first roller 132 and the second roller 136 can be different than that shown.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A three-dimensional object printing system comprising:
a material applicator configured to expel material;
a platform configured to move in a process direction to enable the material applicator to form a layer of an object on the platform with the material expelled from the material applicator as the platform moves past the material application in the process direction;
a belt assembly positioned opposite the platform, the belt assembly including:
a first roller configured to rotate so a portion of the circumference of the first roller closest to the platform moves in a direction opposite the process direction;
a second roller located at a position that is at a higher gravitational potential than the first roller, the second roller having a heater configured to direct heat to a first portion of the second roller that is at a lower gravitational potential than a second portion of the second roller that is at a highest gravitational potential on the second roller, the first portion following the second portion in a direction of rotation of the second roller, the heater heating the first portion of the second roller to a temperature high enough to reduce a viscosity of the material forming the layer of the object on the platform, the temperature being higher than a temperature of the second roller outside of the first portion;
a continuous belt wrapped about the first roller and the second roller to form a continuous loop about the first roller and the second roller;
an actuator operatively connected to the first roller or the second roller to drive the operatively connected first roller or second roller and move the continuous belt about the first roller and the second roller to remove a portion of the material forming the layer of the object and to transport the removed portion of the material to the second roller; and
a first blade positioned to contact the continuous belt opposite the second roller after the first portion of the second roller has heated the material removed by the continuous belt to the temperature that reduces the viscosity of the material removed by the continuous belt and scrape the material from the continuous belt after the material removed by the continuous belt has been heated by the first portion of the second roller.

2. The printing system of claim 1 further comprising:
a waste container positioned to receive the removed portion of material scraped from the continuous belt by the first blade.

3. The printing system of claim 1 further comprising:
a second blade positioned to contact the continuous belt after the first blade has removed the portion of the material from the continuous belt and scrape any removed portion of the material remaining on the belt.

4. The printing system of claim 3 further comprising:
a third roller positioned between the first roller and the second roller within the continuous belt, the third roller having a center that is offset from a line between a center of the first roller and a center of the second roller to bend the continuous belt toward the second blade; and
the second blade is positioned to contact the continuous belt opposite the third roller to scrape any removed material remaining on the continuous belt.

5. The printing system of claim 4 wherein the third roller is positioned nearer the first roller than the second roller is to the first roller.

6. The printing system of claim 5 further comprising:
a waste container positioned to receive the portion of material removed by the first blade and the remaining portion of the removed material removed from the continuous belt by the second blade.

7. The printing system of claim 1 further comprising:
a heater configured to heat the first blade.

8. The printing system of claim 5 wherein the third roller has a smaller diameter than the first roller and the second roller and the diameter of the first roller is equal to the diameter of the second roller.

9. The printing system of claim 1 wherein the material applicator is positioned a first distance from the platform and the first roller is positioned a second distance from the platform, the second distance being smaller than the first distance.

10. An assembly for removing a portion of material from an object in a three-dimensional printing system comprising:

a first roller and a second roller, the second roller being positioned at a higher gravitational potential than the first roller;

a continuous belt wrapped about the first roller and the second roller, the second roller having a heater configured to direct heat to a first portion of the second roller and a portion of the continuous belt contacting the first portion of the second roller, the first portion of the second roller is at a lower gravitational potential than a second portion of the second roller that is at a highest gravitational potential on the second roller, the first portion following the second portion in the direction of rotation of the second roller, the first portion of the second roller and the portion of the continuous belt contacting the first portion of the second roller being heated to a temperature high enough to reduce a viscosity of a predetermined material, the temperature being higher than a temperature of the second roller outside of the first portion;

an actuator operatively connected to the first roller or the second roller to drive the operatively connected first roller or the second roller and rotate the continuous belt about the first roller and the second roller to rotate the continuous belt to remove a portion of a layer of the predetermined material from a layer of an object and to transport the removed portion of the layer of the predetermined material to the second roller;

a first blade positioned to contact the continuous belt after the removed portion of the layer of the predetermined material on the continuous belt has been heated to the temperature that reduces the viscosity of the removed portion of the layer of the predetermined material and scrape the removed portion of the layer of the predetermined material from the continuous belt;

a third roller positioned between the first roller and the second roller within the continuous belt, the third roller having a center that is offset from a line between a center of the first roller and a center of the second roller to bend the continuous belt away from the line between the center of the first roller and the center of the second roll; and a second blade positioned to contact the continuous belt at a position opposite the third roller to scrape any remaining removed portion of the layer of the predetermined material from the continuous belt.

11. The assembly of claim 10 further comprising:

a waste receptacle positioned to receive the scraped portion of material from the first blade.

12. The assembly of claim 11 wherein the third roller has a smaller diameter than the first roller and the second roller and the diameter of the first roller is equal to the diameter of the second roller.

* * * * *